US012789510B2

(12) United States Patent
Descamps et al.

(10) Patent No.: US 12,789,510 B2
(45) Date of Patent: Nov. 10, 2026

(54) ENAMELED GLAZING

(71) Applicant: AGC GLASS EUROPE, Louvain-la-Neuve (BE)

(72) Inventors: Fabien Descamps, Gosselies (BE); Kadosa Hevesi, Namur (BE); Christian Kotkowiak, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 142 days.

(21) Appl. No.: 18/564,862

(22) PCT Filed: Jun. 21, 2022

(86) PCT No.: PCT/EP2022/066820
§ 371 (c)(1),
(2) Date: Nov. 28, 2023

(87) PCT Pub. No.: WO2022/268773
PCT Pub. Date: Dec. 29, 2022

(65) Prior Publication Data
US 2024/0383234 A1 Nov. 21, 2024

(30) Foreign Application Priority Data
Jun. 21, 2021 (EP) .................................... 21180635

(51) Int. Cl.
*B32B 17/10* (2006.01)
*B32B 1/00* (2024.01)
(Continued)

(52) U.S. Cl.
CPC .......... *B32B 17/10348* (2013.01); *B32B 1/00* (2013.01); *B32B 17/10036* (2013.01);
(Continued)

(58) Field of Classification Search
CPC ................ B32B 17/10348; B32B 1/00; B32B 17/10036; B32B 17/10091;
(Continued)

(56) References Cited

U.S. PATENT DOCUMENTS

2015/0376935 A1* 12/2015 Greiner ................. E06B 3/6733 65/41
2020/0399953 A1* 12/2020 Kuster ................ C03C 17/3681
(Continued)

FOREIGN PATENT DOCUMENTS

WO WO-2020064940 A1 * 4/2020 ....... B32B 17/10229
WO WO-2021107707 A1 * 6/2021 ............... C03C 8/14

OTHER PUBLICATIONS

International Search Report issued Sep. 27, 2022 in PCT/EP2022/066820, filed on Jun. 21, 2022, 4 pages.

*Primary Examiner* — Tahseen Khan
(74) *Attorney, Agent, or Firm* — Oblon, McClelland, Maier & Neustadt, L.L.P.

(57) ABSTRACT

A method to produce a bent and/or tempered glazing offering improved thermal comfort, including providing a glass sheet having an outer-side surface and an interior-side surface, applying a thermal radiation reflective coating over a layer of the surface of the interior-side surface, applying a black ceramic layer on a portion of the interior-side surface, the black ceramic layer covering at least partially the thermal radiation reflective coating and/or running alongside the area covered by the thermal radiation reflective coating, and hot bending and/or tempering the glass sheet. The black ceramic layer has a pattern that mitigates the contrast in emissivity between the area where the thermal radiation reflective coating is not covered by the black layer and the area where the black ceramic layer covers at least partially the thermal radiation reflective coating and/or the black ceramic layer
(Continued)

runs alongside the area covered by the thermal radiation reflective coating.

11 Claims, 5 Drawing Sheets

(51) Int. Cl.
*C03B 23/023* (2006.01)
*C03B 27/012* (2006.01)
*C03C 17/34* (2006.01)

(52) U.S. Cl.
CPC .. *B32B 17/10091* (2013.01); *B32B 17/10889* (2013.01); *B32B 17/10935* (2013.01); *C03B 23/0235* (2013.01); *C03B 27/012* (2013.01); *C03C 17/34* (2013.01); *B32B 2250/03* (2013.01); *B32B 2250/40* (2013.01); *B32B 2255/20* (2013.01); *B32B 2255/28* (2013.01); *B32B 2307/304* (2013.01); *B32B 2315/02* (2013.01); *B32B 2315/08* (2013.01); *B32B 2605/08* (2013.01); *C03C 2218/328* (2013.01)

(58) Field of Classification Search
CPC ........ B32B 17/10889; B32B 17/10935; C03B 27/012; C03B 17/34; C03B 23/0235
USPC .......................................................... 428/174
See application file for complete search history.

(56) References Cited

U.S. PATENT DOCUMENTS

2021/0002165 A1* 1/2021 Wang .................. C03C 17/3634
2021/0340060 A1 11/2021 Jamart et al.

* cited by examiner

ENAMELED GLAZING

CROSS REFERENCE TO RELATED APPLICATIONS

This application is a National Stage entry under 35 U.S.C. § 371 of PCT/EP2022/066820, filed on Jun. 21, 2022, and claims priority to EP patent application Ser. No. 21/180,635.1, filed on Jun. 21, 2021, the entire contents of which are incorporated herein by reference.

FIELD OF THE INVENTION

The invention relates to a glazing and more particularly to a vehicle glazing. More particularly, the invention relates to a glazing having thermal-radiation-reflecting coating, to use thereof and a method to produce a such glazing.

BACKGROUND OF THE INVENTION

The use of glazing with low-emissivity coating, as a thermal-radiation-reflecting coating, is extending and becomes mandatory in many glazing applications for the interesting heat-management properties it brings to the end-user.

In parallel, glazed roofs are increasingly being substituted for traditional roofs that are layer of the body of vehicles. The choice of these roofs is a result of car manufacturers offering to their customers this option, which makes the vehicle seem like it opens onto the exterior, like a convertible, without the drawbacks of convertibles, these roofs maintaining the comfort levels of traditional sedans.

The aim of choosing glazed roofs, as mentioned above, is to increase the brightness of the passenger compartment. This increase in brightness must not be obtained at the expense of other properties that ensure passenger comfort and in particular passenger thermal comfort. The presence of glazed roofs, motivated by this brightness increase, also increases heat exchange with the exterior. This is observed via the greenhouse-effect mechanism when the vehicle is exposed to intense solar radiation. However, the roof must also contribute to maintaining the temperature of the passenger compartment when it is cold.

Various measures are employed to control thermal conditions, including the use of high-selectivity glazing units. These conditions result from the choice of the glass used (most often mineral glass, but also possibly organic glass). Additional filters borne by these glazing units, especially filters consisting of systems of layers selectively reflecting the infrared, also have a bearing on these conditions. Solutions addressing these requirements are known from the prior art. This is the case in particular of patent EP 1 200 256.

The presence of a glazed roof modifies the conditions of thermal comfort experienced by occupants of the vehicle. Although heating when the vehicle is exposed to the sun calls for the conditions described above in order to decrease the energy transmission as much as possible, the presence of glazed roofs may also lead to passengers experiencing a sensation qualified "cold shoulder", this sensation being caused by heat loss from the passenger compartment when the exterior temperature is lower than a comfortable room temperature.

In practice, to restore passenger comfort levels, manufacturers essentially use a screen that allows the interior surface of the glazing unit to be covered in its entirety, such as roller blind. A screen and the elements that are associated therewith, especially those used to motorize its deployment, are costly increase the weight of the vehicle and decrease the space between passengers head and roof of the vehicle.

In order to not have to use a screen as described above, it is known to provide roofs through which heat loss is minimized. In order to achieve this result, low-E layers (low-emissivity layer), as reflective thermal radiation coating, may be provided over the surface of a face of the glazed roof which is turned toward the passenger compartment. It is for example disclosed in EP3720701 a glazed roof provided with a low-E coating.

In addition to having a glazed roof showing good thermal properties, the glazed roof may be bent to fit with the design of the car. More and more complex-shaped glazed roofs are requested by the car manufacturers.

Thus, a glazed roof provided with a thermal radiation reflective coating and more particularly a low-E coating provides a best possible compromise between vision outside through the roof and good thermal properties thanks to its long-waves infrared (IR) energy reflection properties.

In the trendy search for ever better thermal efficiency of vehicles and also of buildings, low-E coated glasses are also useful in many other cases. For example, one could improve the global heat-loss of a vehicle's cabin in cold weather by coating all glazed surfaces (e.g. windshield, side-lites and back-lites) with a low-E coating.

However, to produce a bent and/or tempered glazing provided with a low-E coating is not so easy because of the physical properties of the low-E coating. Indeed, the infrared (IR) energy reflection properties (low absorbance) of low-E coatings affect the bending process to shape the glass sheets of the glazing. Thus, it is more difficult to bend a glass sheet provided with a low-E than a glass free of low-E coating due to its physical properties.

Moreover, a bent and/or tempered glazing is often provided with a black ceramic layer (band) along its perimeter, especially in the case of vehicle cabin applications. This is particularly the case for vehicle glazing including glazed roof. The role of the black layer is to hide from outside of the vehicle the non-aesthetic components such as busbars and/or to protect component from UV-light such as glue and/or to improve the adhesion between glass and other element. This is adding complexity in the bending process of a glass sheet provided with a thermal radiation reflective coating and more particularly a low-E coating. This black ceramic has a high heating absorbance. The combination of having a low-E coating in the visible area and the black layer along the perimeter on the same face of the glass sheet to be bent leads to a non-uniform and non-smooth bending because of the two diametral difference of thermal behavior of the low-E coating and the black band.

Indeed, the black layer absorbs the IR and consequently heating up while the Low E reflects the IR and thus remaining relatively cold in comparison with the black band. Black layer is bending significantly while the area provided with low-E coating remains flat. Thus, since the black layer area and the low-E area are closed to each other, a so-called "reverse curvature" is created leading to a "bath shape" or U-shape that is an unacceptable unsmooth shape by the car manufacturers. The same non-homogeneous heating up of the glass sheet may create critical issue during flat glass conveying in sheet by sheet process, as glass may no more remain flat on the rollers and could achieve wrong positioning in the pressing area or be marked on the contact surface with many defects. The car manufacturers require progressive/smooth shape instead of the "U" shape for aesthetical reason and/or functional reason such as the wipe ability.

In the case of tempering processes, the big temperature difference between the low-E-coated area and the black layer area of the layer may lead to problematic inhomogeneous fragmentation in case of glass breakage.

Generally, to compensate the high heating absorbance of the black layer provided along the perimeter of the glazing and to avoid or limit non desired local bending, furnace's heating parameters to bent glass sheet are finetuned (less heating at black layer position). Another way to compensate the high heating absorbance of the black layer is to add a heat absorber at the black layer location. Both of these "tricks" have their limitations as they are introducing severe constraints on the processes and might even not be applicable depending on the furnace design.

Thus, there is a need to have a thermal radiation reflective coated and more particularly a low-emissivity (low-E) coated glazing with a good aesthetic and to propose a method to produce a bent low-E coated glazing. More particularly there is a need to have a low-emissivity (low-E) coated glazed roof.

SUMMARY DESCRIPTION

The object of the invention is to achieve a method to produce a bent and/or tempered glazing offering improved thermal comfort, comprising the following steps:

a. Providing a glass sheet having an outer-side surface and an interior-side surface, b. Applying a thermal radiation reflective coating over at least a layer of the surface of the interior-side surface of the glass sheet, c. Applying a black ceramic layer on at least a portion of at least the interior-side surface of the glass sheet, the black ceramic layer covering at least partially the thermal radiation reflective coating and/or running alongside the area covered by the thermal radiation reflective coating, d. Hot bending and/or tempering the glass sheet.

According to the present invention, the black ceramic layer has a pattern that mitigates the contrast in emissivity between the area where the thermal radiation reflective coating is not covered by the black layer and the area where the black ceramic layer covers at least partially the thermal radiation reflective coating and/or runs alongside the area covered by the thermal radiation reflective coating.

Another object of the invention is to achieve a method to produce a bent and/or tempered glazed roof provided with a thermal radiation reflective coating and more particularly a low-E coating. A further object is to propose a bent and/or tempered glazing and more particularly a glazed roof provided with a thermal radiation reflective coating and more particularly a low-E coating.

According to a preferred embodiment of the present invention, the glazing is a glazed roof comprising at least a bent glass sheet having a bent outer-side surface and an interior-side surface. The glazed roof has on interior-side surface of the glass sheet a thermal radiation reflective coating and more particularly a low-E coating, that substantially reflects light, in particular in the infrared range.

The present invention concerns also a laminated vehicle glazing comprising an outer glass sheet having an outer-side surface and an interior-side surface, an inner glass sheet having an outer-side surface and an interior-side surface, and a thermoplastic intermediate layer that joins the interior-side surface of the outer pane to the outer-side surface of the inner pane, wherein the glazing has on interior-side surface of the inner glass sheet a thermal radiation reflective coating and more particularly a low-E coating, that substantially reflects or absorbs rays outside the visible spectrum of solar radiation, in particular infrared. The laminated glazing is preferably a laminated glazed roof.

Description

The object of the invention is to achieve a method to produce a bent and/or tempered glazing offering improved thermal comfort, comprising the following steps:

a. Providing a glass sheet having an outer-side surface and an interior-side surface, b. Applying a thermal radiation reflective coating over at least a layer of the surface of the interior-side surface of the glass sheet, c. Applying a black ceramic layer on at least a portion of at least the interior-side surface of the glass sheet, the black ceramic layer covering at least partially the thermal radiation reflective coating and/or running alongside the area covered by the thermal radiation reflective coating, d. Hot bending and/or tempering the glass sheet.

According to the present invention, the black ceramic layer has a pattern that mitigates the contrast in emissivity between the area where the thermal radiation reflective coating is not covered by the black layer and the area where the black ceramic layer covers at least partially the thermal radiation reflective coating and/or runs alongside the area covered by the thermal radiation reflective coating.

Thus, thanks to the present invention, the black ceramic layer has a pattern to compensate the emissivity of the thermal radiation reflective coating and the heat absorption of the black ceramic layer during the bending and/or tempering step and to have a smoother temperature profile in the area where the black ceramic layer is juxtaposed with the thermal radiation reflective coating and more particularly a low-E coating.

According to another embodiment of the present invention, it is proposed a method to produce a laminated bent coated glazing, the method comprising the following steps:

a. Providing a glass sheet having an outer-side surface and an interior-side surface, b. Applying a thermal radiation reflective (more particularly a low-E) coating over at least a layer of the surface of the interior-side surface of the glass sheet, c. Applying a black ceramic layer along at least a layer of the perimeter of at least the interior-side surface of the glass sheet, the black ceramic layer covering at least partially the thermal radiation reflective coating, d. Hot bending and/or tempering the glass sheet.

According to the present embodiment, the black ceramic layer has a pattern to compensate during the bending step the emissivity of the thermal radiation reflective coating and/or the heat absorption of the black ceramic layer and to have a smooth temperature profile in the area where the black ceramic layer covered at least partially the thermal radiation reflective coating and more particularly a low-E coating. According to a preferred embodiment, the glazing is a laminated vehicle and more particularly a laminated vehicle glazed roof.

Thus, the inventors have surprisingly shown that by modifying the heat absorption behavior of the black ceramic layer in contact with the thermal radiation reflective coating and more particularly a low-E coating, the "U shape" and/or "Reverse curvature" may be reduced even. Thus, a smoother absorption coefficient transition between the black ceramic layer and the area provided with the thermal radiation reflective coating and more particularly a low-E coating may be obtained, leading to a progressive temperature profile during the hot bending step and consequently to a smooth glass shape according to the car's design and requested by car manufacturers.

The pattern of the black ceramic layer is designed to achieve the requested shape of the glazing. Thus, a shading/a gradation between the thermal radiation reflective coating or more particularly the low-E coating, the glass sheet and the black ceramic layer allows to get a smooth temperature (T°) profile.

According to one embodiment of the present invention, the black ceramic layer has a pattern alternating zones provided with and zones free of black ceramic layer such as a zebra pattern or dot pattern. The size of the pattern as well as it position inside the black ceramic layer are designed according the geometrical defect to be corrected or the shape to be targeted. Thus, a smooth temperature profile is obtained during the hot bending step and consequently to a smooth glass shape according to the car's design and requested by car manufacturers.

According to one embodiment of the present invention, the black ceramic layer is a layer of black ceramic layer having no (or very low) transmission in the visible optical range but having a high transparency in the infrared wavelength range of interest for the application. Enamels transparent to infrared wavelength range. Thus, the use of enamel transparent in the infrared allows to mitigate the difference of emissivity between the areas provided with enamel and the areas free of enamel within the black band.

The glazing is intended, in a window opening, to separate an interior space, in particular the interior of a vehicle from the external environment. The glazing is preferably a laminate glazing and more preferably a glazed roof and comprises a first and a second glass that are referred to in the context of the invention as "outer glass sheet" and "inner glass sheet" and are joined to one another via a thermoplastic intermediate layer. In the context of the invention "inner glass sheet" is the glass sheet that faces the interior in the installed position. "Outer glass sheet" refers to the pane facing the external environment in the installed position. "Interior-side surface (or inside or inner surface)" means, in the context of the invention, that surface of the panes that faces the interior in the installed position. "Outer-side surface (outside or outer surface)" means, in the context of the invention, that surface of the panes that faces the external environment in the installed position.

The surfaces of the glass panes are typically referred to as follows. The outer side of the outer pane is referred to as side 1. The inner-side of the outer pane is referred to as side 2. The outer side of the inner pane is referred to as side 3. The inner-side of the inner pane is referred to as side 4.

The interior-side surface of the outer pane and the outer-side surface of the inner pane face one another and are bonded to one another by means of the thermoplastic intermediate layer.

The thermoplastic intermediate layer is formed by one or a plurality of thermoplastic films. The thermoplastic films preferably contain polyvinyl butyral (PVB), ethylene vinyl acetate (EVA), polyurethane (PU) and/or mixtures thereof and/or copolymers thereof, particularly preferably polyvinyl butyral. The films are preferably based on the materials mentioned but can, however, contain other components, for example, plasticizers, colorants, IR or UV absorbers, preferably with a content of less than 50%.

It is preferred for the at least one thermoplastic polymer film, in particular the at least one PVB film, to be a tinted thermoplastic polymer film, in particular a tinted PVB film, with a light transmittance of 2 to 80%, preferably of 5 to 50%, and particularly preferably of 8 to 36%. The use of a tinted thermoplastic polymer film has the advantage that the light transmittance, relative to the entire laminated glass, can advantageously be adjusted by the selection of the thermoplastic polymer film. In addition, by combining thermoplastic polymer films with specific light transmittance and specific low-E layers, the reflectance at side 4 of the composite glass pane can be adjusted to the preferred range of less than 6%.

The individual polymer films, in particular the PVB films, preferably have a thickness of about 0.2 mm to 1 mm, for example, 0.38 mm or 0.76 mm. Other properties of the composite glass pane can be influenced by the thickness of the films. For example, thicker PVB films provide improved sound damping, in particular when they contain an acoustically active core, increased break-in resistance of the composite glass pane, and also increased protection against ultraviolet radiation (UV protection).

According to the present invention, the glass sheet and in the case of a laminated glazing, the outer and the inner glass sheets, is preferably made of glass, preferably soda lime glass, alkali aluminosilicate glass. The glass sheets may be gray-colored glass sheets.

Independently of one another, the outer and/or the inner pane preferably has a thickness of 0.1 to 4 mm, preferably of 1 to 4 mm, particularly preferably of 1.6 mm to about 2.1 mm.

According to one embodiment of the present invention, the thermal-radiation-reflecting coating can also be referred to as a coating with low emissivity, an emissivity-reducing coating, low-E coating, or low-E layer. Its role is to reflect thermal radiation, i.e., in particular, IR radiation of longer wavelength than the IR component of solar radiation. At low outside temperatures, the low-E coating reflects heat back into the interior and reduces the cooling of the interior. At high outside temperatures, the low-E coating prevents the absorbed thermal radiation of the heated glazing to be re-emitted toward the interior and reduces the heating of the interior. On the interior side of the inner pane, the coating according to the invention reduces the emission of thermal radiation from the pane into the interior particularly effectively in the summer and reduces the transmission of heat into the external environment in the winter.

It is chosen to place the coating in position 4 (or position 2 in case of single glass sheet roof) despite the fact that in this position the layers are not protected from degradation, especially mechanical degradation. It is possible to choose low-E layers that are mechanically and chemically resistant enough.

Advantageously, for good mechanical resistance, the coatings are "hard" layers, such as those produced by PECVD, CVD or pyrolytic techniques. However, low-E systems may also be produced using vacuum cathode sputtering techniques, provided that the systems obtained are composed of layers that are sufficiently resistant.

According to the invention, it is preferred to use a low-emissivity coating system the emissivity of which is lower than 0.3 and preferably lower than 0.2 and in a particularly preferred way lower than 0.1.

The most common pyrolytic low-E (low-emissivity) systems comprise a layer of doped tin oxide deposited on a first layer having the role of neutralizing color in reflection. The layer making contact with the glass is ordinarily a layer of silica or silicon oxycarbide, optionally modified by additives. Tin oxide layers, compared to the layers of systems deposited by cathode sputtering, are relatively thick, i.e. more than 200 nm and in certain cases more than 450 nm in thickness. These thick layers are sufficiently resistant to withstand exposure to mechanical and/or chemical attack.

The glass sheets used to form the laminated glazing unit may have the same composition and possibly the same thickness, which may make them easier to shape beforehand, the two sheets being bent simultaneously for example. Most often the glass sheets have different compositions and/or thicknesses, and in this case they may be shaped separately.

The possible presence of colored interlayers participates in the absorption of light. Their use may be envisioned as a partial substitute at least to the contribution of the glass sheets to establishing a particular color. This situation may arise, for example, when, in order to integrate photovoltaic elements into the glazing unit, at least the external glass sheet is a sheet of poorly absorbent glass or even extra-clear glass. However, the external sheet may also be a sheet of absorbent glass, and there is no need for a colored interlayer.

The glass sheet turned toward the passenger compartment may also, exceptionally, be made of clear glass. It is most often absorbent and contributes to the overall decrease in energy transmission. When its transmission is limited, it allows non-transparent elements present in the glazing unit to be at least partially masked from the sight of passengers.

The color in transmission and reflection is also important in the choice of the sheets of glass and interlayers.

Generally, regarding production of the glazing (and more particularly a vehicle glazed roof) according to the invention, it is recommended to bear in mind the capacity of the constituent elements to withstand the processing used to shape and assemble the glazing unit. The roofs of vehicles generally have curvatures that are relatively unaccentuated except possibly those of the edges of these glazing units. The shaping of mineral glass sheets comprises, at least for one of them and most often for both, processing that requires exposure to a high temperature (650-700° C.) that causes the glass to soften.

In an advantageous further development of the invention, a functional element with electrically controllable optical properties is embedded in the thermoplastic intermediate layer. This enables visibility through the composite pane to be controlled electrically, in particular between a clear transparent state and a state of reduced transmittance. The values indicated for the light transmittance of the composite pane or of the intermediate layer always refer to the composite pane with the functional element in the clear, transparent state.

The present invention also relates to the use of the glazing according to the invention in a vehicle, preferably as a roof panel of a vehicle, particularly preferably as a roof panel of a motor vehicle, in particular a passenger car.

The present invention also relates to the use of the glazing according to the invention in a vehicle, preferably as a windshield, side-lite or back-lite of a motor vehicle, in particular a passenger car.

The present invention further relates to a vehicle, preferably a motor vehicle including a glazing, particularly a glazed roof, according to the invention.

DRAWINGS

In the following, the invention is explained in detail with reference to drawings and exemplary embodiments. The drawings are schematic representations and not to scale. The drawings do not restrict the invention.

Figure 3A:
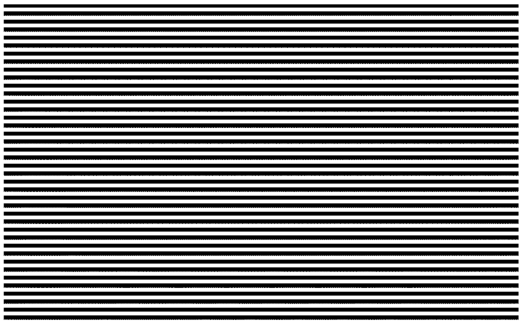
Figure 3B:
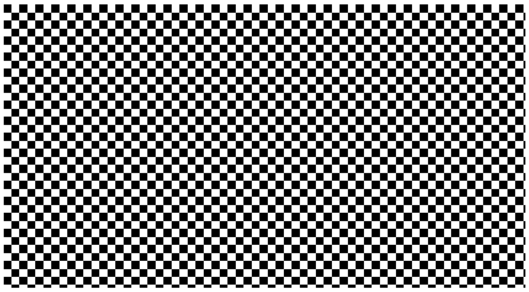
Figure 3C:
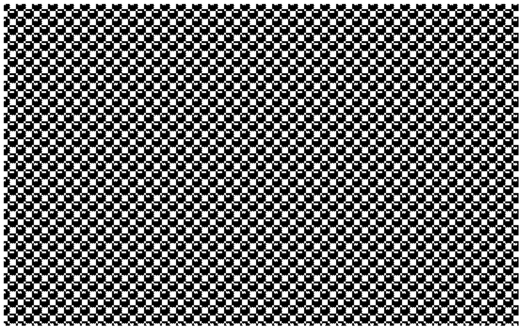
Figure 4:
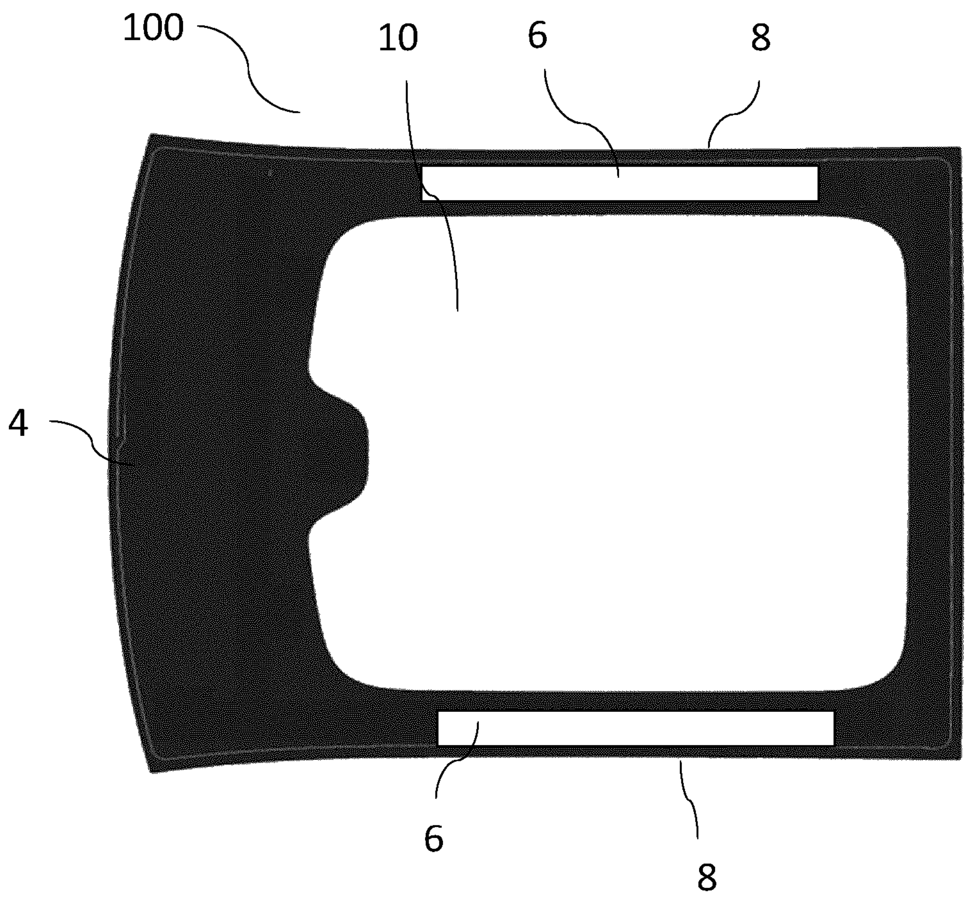
Figure 5:
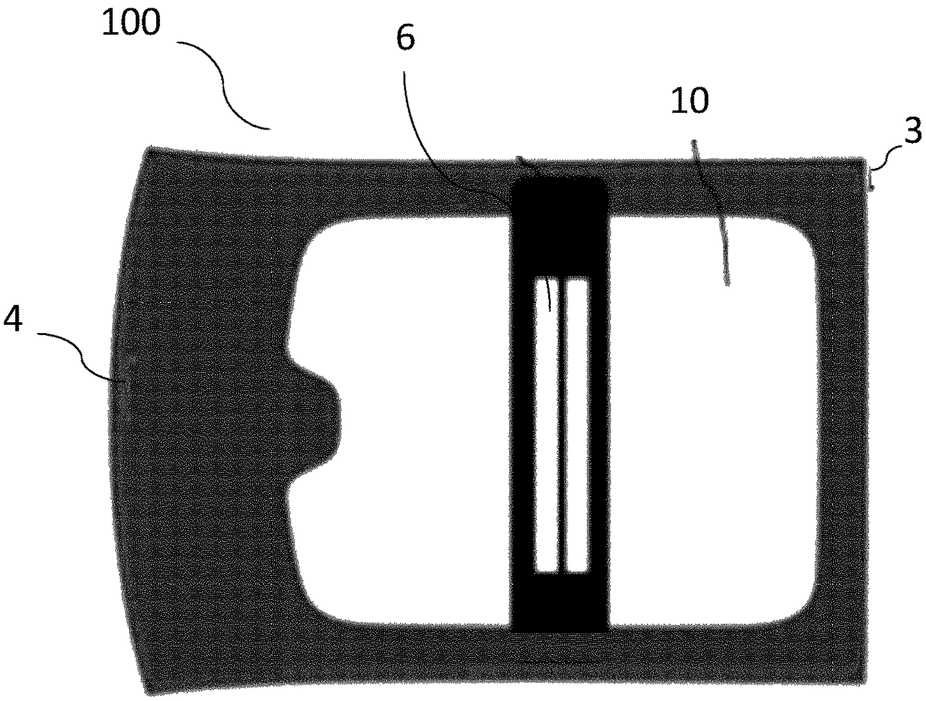
Figure 6:
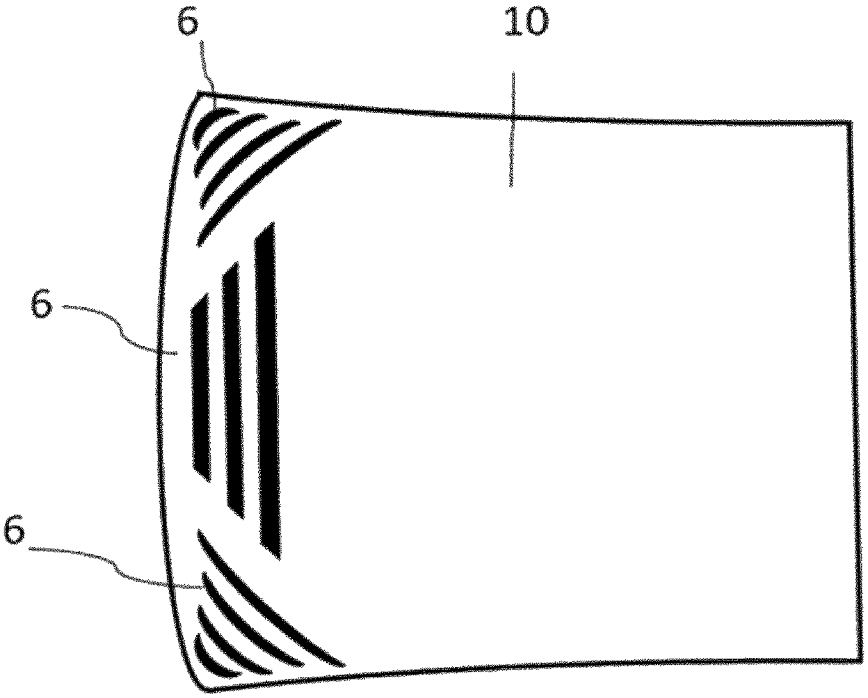

FIGS. 3*a* to 3*c* show examples of pattern of the black ceramic band;

FIG. 4 shows a glazing unit according to one embodiment of the present invention;

FIG. 5 shows a glazing unit according to another embodiment of the present invention; and FIG. 6 shows a glazing unit according to yet another embodiment of the present invention.

DETAILED DESCRIPTION OF THE INVENTION

Even if the following description is oriented to a vehicle laminated glazed roof, the present invention may be applicable to a vehicle single glazing or a glazing for building.

Figure 1:
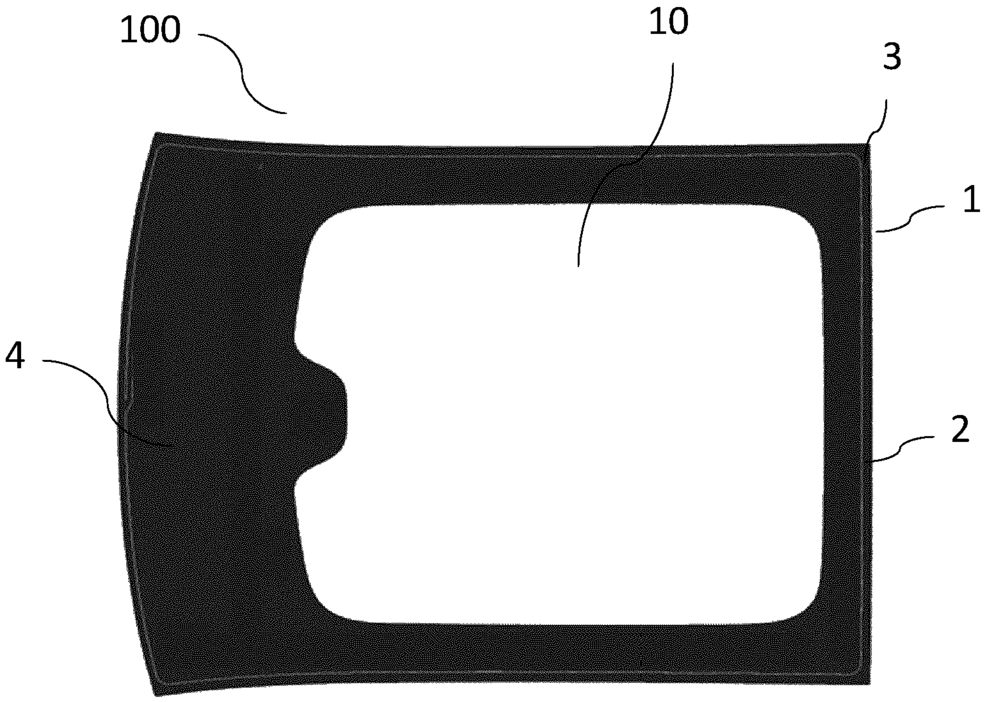
FIG. 1 shows a laminated glazed roof according to prior art.

The assembly of elements in FIG. 1 is a laminated glazed roof according to prior art. More particularly the FIG. 1 is a top view of a laminated glazed roof. The face visible on the drawing is the inner-side of the glazing toward the passenger compartment.

The sheets shown in FIG. 1 are not curved, for the sake of clarity. In practice roofs, whether glazed or not, have curvatures that are ordinarily more accentuated at their edges in the place where they join with the body of the car for a fit, chosen for its "design", aerodynamics and its "flush" appearance, corresponding to a good surface continuity between the contiguous elements.

The glazing unit 100 in FIG. 1 comprises two glass sheets, an external glass sheet 1 and an internal glass sheet 2. Most frequently, these two glass sheets are made of highly absorbent colored glass, such that the light transmission is limited only by the effect of these two glass sheets, for example to less than 50%, and in a configuration of this type preferably to less than 30%.

The glasses used for these sheets are for example gray glasses or the green-tinted gray glasses. In one example, the glass sheets 1 and 2 have respectively a thickness between 1.6 mm and 2.6 mm In FIG. 1, the glass sheets are shown with the enamel patterns 3 (as a black ceramic band) that are conventionally used to mask the edges of glazing units. As shown in FIG. 1, a large layer is provided in the area 4, the area 4 being the area close to the windshield once installed with the car body. Enamels of this type could for example be placed on the internal face of sheet 1, therefore in position 2, concealing all of the adhesive joints and localized connections at the edge of the glazing unit. The masking enamels may also be located in position 4, in other words on that face of the glazing unit which is exposed to the interior of the passenger compartment. However, in this position, for an observation from the exterior of the vehicle, they do not mask elements contained in the laminate. It is also possible to place the masks in position 2 and in position 4 as illustrated in FIG. 1.

A system 10 of low-E layers, as a thermal radiation reflective coating, is applied over the surface of the internal glass sheet 2 on the face turned toward the passenger compartment before applying the enamel pattern according to prior art. Then, the glass sheet is hot bent according to the requirement of the car manufacturer to fit with the design of the car body. The bending process occurred at a temperature comprised between 500° C. and 700° C. In case of a laminated glazed roof, the inner and the outer glass sheet may be bent separately or together according to well-known technologies. Unfortunately, due to the difference of thermal behavior of the coating and the black ceramic band, a “reverse curvature” is created during the heating up of the glass sheet, leading to a “tub shape” or U-shape that is an unacceptable non-smooth shape by the car manufacturers. The same non-homogeneous heating up of the glass sheet is creating critical issue during flat glass conveying in sheet by sheet process, as glass may no more remain flat on the rollers and could achieve wrong positioning in the pressing area or be marked on the contact surface with many defects. Car manufacturers require progressive/smooth shape instead of the “U” shape for aesthetical reason and/or functional reason such as the wipe ability. Thus, the glazing of the prior art provided with a low-E coating, and more generally with a thermal radiation reflective coating, are not easily bendable.

The manner to apply the thermal radiation reflective coating and the black ceramic layer on the internal glass sheet 2 on the face turned toward the passenger compartment are well known and are not described in details. Generally, the thermal radiation reflective coating and more particularly the low-E coating is first provided over all or partially on the surface of the internal glass sheet 2 on the face turned toward the passenger compartment and then the black ceramic layer is applied along the periphery of the glass sheet with or without full (or partial) overlapping on the coating. The black layer is larger in the area 4 close to the windshield and wherein inner some items such as upholsteries or rear mirror, cameras may be fixed on, in the face of the roof toward the car’s compartment.

This low-E coating system 10 of is not shown in FIG. 1 for sake of clarity but is in fact not dissociable from the sheet under which it is deposited.

Once the inner and the outer glass sheets (in case of laminated roof) are bent, they are joined together thanks to at least one thermoplastic interlayer sheet (not shown).

Figure 2:
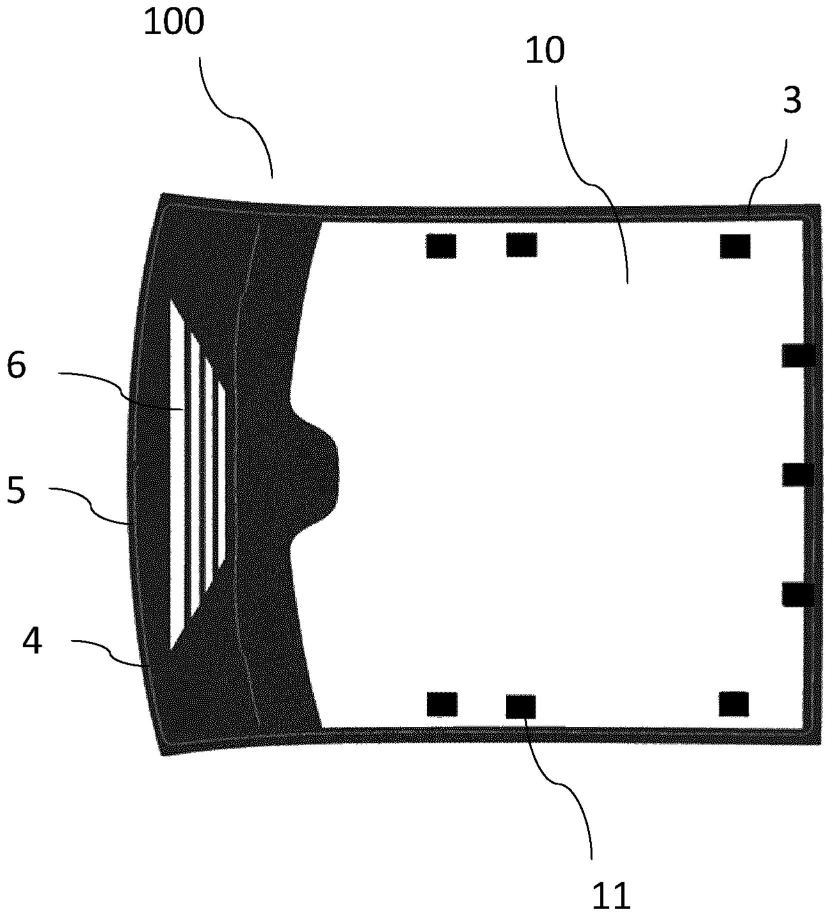
FIG. 2 shows a glazing unit according to one embodiment of the present invention.

FIG. 2 shows one embodiment according to the present invention. As for FIG. 1, a laminated glazed roof 100 is represented. An outer 1 and an inner 2 glass sheets are joined together thanks to at least one thermoplastic interlayer layer sheet (not shown). Before laminating the outer 1 and the inner 2 glass sheets together, a low-E coating system 10, as a thermal radiation reflective coating 10, is applied over of the inner glass sheet 2 on the face turned (position 4) toward the passenger compartment.

The black ceramic layer 3 is applied along the periphery of the inner glass sheet 2 on the face turned (position 4) toward the passenger compartment. The black ceramic layer 3 is provided with a larger enamel pattern 4 in the upper layer of the glazing that will be in contact with the car body close to the windshield. An enamel pattern 6 that mitigates the contrast in emissivity during the step of heating up of the bending and/or tempering process between the area where the thermal radiation reflective coating is provided in a central area 5 of the larger enamel pattern 4. The pattern 6 according to the embodiment described in FIG. 2 has successive rectangular shapes with sizes decreasing progressively from the upper layer of the glass sheet to the layer toward the center of the glazed roof. Thus, an area of the low-E coating 10 is not covered (or partially covered) by the black ceramic band. it is understood that the pattern of the black ceramic layer 6 according to the present invention is designed to mitigates the contrast in emissivity during the step of heating up of the bending and/or tempering process between the area where the thermal radiation reflective coating.

According to the present invention, the black ceramic layer 3 has a pattern 6 that mitigates the contrast in temperature increase during the heating up step between the area of the glass covered by black ceramic layer and the area of the glass coated with thermal radiation reflective coating and that generates a smooth temperature profile across the area where the black ceramic layer covers at least partially the thermal radiation reflective coating (more particularly a low-E coating) and the area where the thermal radiation reflective coating is not covered by the black band.

According to the present invention, the pattern 6 is designed in the area wherein the black ceramic layer is applied and wherein there is a need to, have a smooth temperature profile to have a final good shape after the bending according to car’s manufacturer requirement, or to keep a flat shape behavior during the conveying operation inside the heating tunnel for sheet by sheet process technology.

Thus, the pattern in the black ceramic layer 6 may be provided in the large area 4 close to the windshield and wherein inner some items such as interior trim or rear mirror, cameras may be fixed on, in the face of the roof toward the car’s compartment. The design may be only provided in the central area of the black band. The position and the design of the pattern will depend on the zone wherein an “U-shape” and/or a “reverse curvature has to be controlled or corrected to correctly bend the glass sheet to obtain the requested shape of the glass sheet and finally the good shape of the roof or homogeneous heating up during the conveying in sheet by sheet process According to the embodiment shown in the FIG. 2, the black ceramic layer 4 (also called enamel band) is provided in the central area 5 with a pattern 6 alternating enameled zone and zones free of enamel. The pattern according to the embodiment of the present invention is a zebra pattern. The width of bands with enamel or free of enamel is determined depending on the requested shape of the glass sheet and the difference of thermal behavior of the enamel and the low-E coating and more generally the thermal radiation reflective coating 10.

As shown in FIG. 3*a* to 3*c*, different patterns may be applied to the black ceramic layer 6 such as zebra pattern as shown in FIG. 3*a*, checkerboard as shown in FIG. 3*b*, or dots pattern as shown in FIG. 3*c*. The zebra length can be along the full width of the glass layer. The width of the line as well as The space between lines may go from few millimeters to several centimeters and is driven by the layer design as well as the issue faced during the heating up operation (bending or conveying). The chase layer or the dots pattern can also have many different designs according to the achievement to be reached on the glass (size can move from several millimeters to several centimeters). The geometry can also be really different according the case we will be faced and be not only lines or squares or dots but possibly ellipsoid, parallelepipedal, . . . .

The size of the design of black enamel 6 as well as its position inside the black layer 3 have to be tuned according to the geometrical defect to deal with or to compensate.

Further to the black ceramic part 3, some part of black ceramic part 11 may be provided on the inner-side of the inner glass to allow gluing or masking some fixing parts.

According to another embodiment of the present invention, the pattern 6 of in the black layer 3 may be a single enamel-free zone, for example along each lateral edge 8 of the layer, as depicted in FIG. 4.

Some glazing configurations might not require to print any kind of enamel or high emissive material on top of the thermal radiation reflective coating and more particularly the low-E coating. In those cases, the whole surface of the coated glass is reflecting the thermal radiation of the furnace and there might be a need for bringing more heat locally than what the furnace equipment may allow.

One solution according to the present invention is to remove the thermal radiation reflective coating and more particularly the low-E coating locally in areas where additional heat is needed and fill the areas with a black enamel. In this way, the un-coated or de-coated areas would have high emissivity and would allow more efficient heat uptake from all radiative sources in the furnace.

This coating removal could also be done with a pattern adapted to both aspects of aesthetical design and heat up-take efficiency of the treated area by mitigating the thermal radiation reflective effect of the coating in areas where more heat uptake is needed to facilitate the shaping of the glazing. The decoating pattern may have alternating zones provided with and free of thermal radiation reflective coating such as a zebra pattern as depicted in fig z but many other types of patterns can be usefully applied, like dot patterns, for example.

Localized coating removal can be obtained by masking or patterning the glass prior to the coating process or coating ablation after coating process by mechanical, chemical or laser treatment, for examples.

Another embodiment of the present invention is shown in FIG. 6. a black enamel 3 with a pattern 6 according to the present invention may be provided for example by printing black enamel on top of the thermal radiation reflective coating 10 and more particularly the low-E coating only in the area where the emissivity should be controlled to allow more efficient heat uptake from all radiative sources in the furnace.

In the case of a laminated glazed roof, the enamel pattern 6 according to the present invention as well as the thermal radiation reflective coating 10 are provided in the inner-side face (position 4) of the inner glass sheet 2.

It is understood than in case of a single glass sheet the enamel pattern 6 and the thermal radiation reflective coating 10 are provided on the inner-side face (position 2) of the glass sheet.

The glass sheet provided over a major layer of its surface with the thermal radiation reflective coating and more particularly the low-E coating and with at least a layer of the periphery of the glass sheet provided with a black ceramic layer and overlapping a layer of the coating is provided with a pattern according to the present invention, is then hot bent at a temperature comprised between 50° and 700° C. to shape the glass sheet as requested by the car's manufacturer.

The "U-shape" or "reverse bending" of the zone covered by the black layer alongside the zone coated with the thermal radiation reflective coating, the black layer optionally overlapping the low-E coated layer of the glass, may be avoided during the bending process or during the glass conveying (sheet by sheet case) when the glass sheet is submitted to temperatures comprised between 500° C. and 700° C.

According to the present invention, in case of a laminated glazing, the glass sheet provided with the thermal radiation reflective coating and more particularly the low-E coating and the black ceramic layer provided with a pattern to compensate during the bending step the emissivity of the thermal radiation reflective coating and/or the heat absorption of the black ceramic layer and to have a smooth temperature profile in the area where the black ceramic layer covers at least partially the thermal radiation reflective coating (more particularly a low-E), is the inner glass sheet, the coating and the black ceramic layer being provided on its inner face (position 4).

Masking enamel is located in position 4, in other words on that face of the glazing unit which is exposed to the interior of the passenger compartment. However, in this position, for an observation from the exterior of the vehicle, they do not mask elements contained in the laminate. It is also possible to place the masks in position 2 and in position 4. The masking patterned enamel according to the present invention is preferably only provided on position 4. Thus, the masking enamel in position 4 is masked from outside by the enamel in position 2. The enamel provided on position 4 is then masked/covered by the upholsteries.

In case of a laminated glazing, the outer glass sheet and more particularly the inner face (position 2) of the outer glass sheet is provided along its periphery with a black ceramic layer to protect components to be fixed on the glazing from UV and/or for aesthetical reasons.

The inner and the outer glass sheets may be bent separately or together according to well-known technologies. After bending, the inner and the outer glass sheets are joined together thanks to at least one thermoplastic interlayer according to well-known technologies.

According to one embodiment of the present invention, the glazing and in particular the glazed roof is made of one a single tempered glass sheet. In that case, the black ceramic layer and the thermal radiation reflective coating and more particularly the low-E coating are provided on the inner face ie the face exposed to the interior of the passenger compartment. Such as glass sheet is typically used for sliding roofs.

According to another embodiment of the present invention and as shown in FIG. 5, the black layer may be provided in a central zone of the glazing and over the low-E coating. The glazing is preferably a laminated glazed roof. The black layer may be provided with zone free of enamel. The free zones of enamel may have a rectangular or any shape suitable to mitigate the contrast in emissivity between the area where the thermal radiation reflective coating is not covered by the black layer during the step of bending or tempering.

One example low-E system having the desired properties consists of a 320 nm-thick layer of tin oxide doped with 2 at % fluorine. This layer is deposited on a layer making contact with the glass, said layer being 75 nm-thick and composed of silicon oxycarbide. The two layers are deposited by CVD. This system leads to an emissivity of about 0.16.

Other low-E coating systems may be produced using a cathode sputtering technique while preserving a satisfactory mechanical resistance. Systems of this type are for example. Comprising transparent conductive oxides, especially doped Indium, Zinc or Tin oxides or comprising low-emissivity nitrides like Ti nitride.

By way of yet another example, a usable system comprises a metal layer of Chromium, Niobium, Tantalum, Molybdenum or Zirconium and mixtures thereof. To protect this metal layer deposited by cathode sputtering, it could be sandwiched between two layers of silicon nitride. This assembly also leads to a satisfactory emissivity with a decrease in the light transmission that may reach 10%, decrease that for the use in question does not constitute a drawback.

The use of these low-E systems considerably improves how comfortable the passenger compartment feels during cold periods and may make the use of a screen superfluous.

The invention claimed is:

1. A method to produce a bent and/or tempered glazing offering improved thermal comfort, comprising:
   a. providing a glass sheet having an outer-side surface and an interior-side surface;
   b. applying a thermal radiation reflective coating over at least a portion of a surface of the interior-side surface of the glass sheet;
   c. applying a black ceramic layer on at least a portion of at least the interior-side surface of the glass sheet, the black ceramic layer covering at least partially the thermal radiation reflective coating and/or running alongside the area covered by the thermal radiation reflective coating; and
   d. hot bending and/or tempering the glass sheet,
   wherein the black ceramic layer has a pattern that mitigates a contrast in emissivity during d. between an area where the thermal radiation reflective coating is not covered by the black layer,
   wherein the black ceramic layer pattern comprises alternating zones provided with and free of black ceramic layer.

2. A method to produce a laminated glazed roof offering improved thermal comfort, comprising:
   a. providing an outer glass sheet having an outer-side surface and an interior-side surface;
   b. providing an inner glass sheet having an outer-side surface and an interior-side surface;
   c. applying a thermal radiation reflective coating over at least a portion of a surface of the interior-side surface of the inner glass sheet;
   d. applying a black ceramic layer along at least a portion of at least the interior-side surface of the inner glass sheet, the black ceramic layer covering at least partially the thermal radiation reflective coating and/or running alongside the area covered by the thermal radiation reflective coating;
   e. hot bending the outer glass sheet and the inner glass sheet separately or together, the inner glass sheet having the black ceramic layer along its perimeter and the thermal radiation reflective coating over at least a layer of the surface of the interior-side surface; and
   f. laminating the outer and the inner glass sheets with a thermoplastic intermediate layer that joins the interior-side surface of the outer glass sheet to the outer-side surface of the inner glass sheet,
   wherein the black ceramic layer has a pattern that mitigates a contrast in emissivity during d. between an area where the thermal radiation reflective coating is not covered by the black layer,
   wherein the black ceramic layer pattern comprises alternating zones provided with and free of black ceramic layer.

3. The method according to claim 2, wherein the glazing is a vehicle laminated glazed roof.

4. A method to produce a bent and/or tempered glazing offering improved thermal comfort, comprising:
   a. providing a glass sheet having an outer-side surface and an interior-side surface;
   b. applying a thermal radiation reflective coating over a surface of the interior-side surface of the glass sheet;
   c. applying a de-coating technique to locally remove the thermal radiation reflective coating and locally applying a black ceramic layer or locally applying the black ceramic layer over the thermal radiation reflective coating; and
   d. hot bending and/or tempering the glass sheet,
   wherein the decoating pattern mitigates a thermal radiation reflective effect of the coating in areas where more heat uptake is needed to facilitate shaping of the glazing, and
   wherein the black ceramic layer forms a pattern comprising alternating zones provided with and free of black ceramic layer.

5. The method to produce a bent and/or tempered glazing roof according to claim 4, wherein the decoating has a pattern of alternating zones provided with and free of thermal radiation reflective coating.

6. The method to produce a vehicle laminated glazed roof according to claim 3, wherein the thermal radiation reflective coating is a low-e coating.

7. A laminated and glazed vehicle roof offering improved thermal comfort produced according to claim 1.

8. The laminated and glazed vehicle roof of claim 7, further comprising a low-emissivity coating system
   wherein the low-emissivity coating system has an emissivity that is no higher than 0.5.

9. The laminated and glazed vehicle roof of claim 8, wherein the low-emissivity coating system comprises at least one layer of a transparent conductive oxide or a layer of low-emissive nitride or a layer of a metallic compound.

10. The laminated and glazed vehicle roof of claim 7, further comprising a low-emissivity coating system
   wherein the low-emissivity coating system has an emissivity that is no higher than 0.3.

11. The laminated and glazed vehicle roof of claim 7, further comprising a low-emissivity coating system
   wherein the low-emissivity coating system has an emissivity that is no higher than 0.2.

* * * * *